Joseph Widman, Cultivator.

PATENTED JAN 7 1868

No. 73217

Witnesses:
Theo Fische
Wm. Spiwin

Inventor:
Jos. Widman
Per Munn & Co.
Attorneys

United States Patent Office.

JOSEPH WIDMAN, OF PANOLA, ILLINOIS.

Letters Patent No. 73,217, dated January 7, 1868.

---

IMPROVEMENT IN CULTIVATORS.

---

*The Schedule referred to in these Letters Patent and making part of the same.*

---

TO ALL WHOM IT MAY CONCERN:

Be it known that I, JOSEPH WIDMAN, of Panola, in the county of Woodford, and State of Illinois, have invented a new and improved Cultivator; and I do hereby declare that the following is a full, clear, and exact description thereof, which will enable others skilled in the art to make and use the same, reference being had to the accompanying drawings, and to the letters of reference marked thereon.

This invention relates to a new and improved cultivator, of that class designed more especially for cultivating corn and other crops which are grown in hills or drills. The invention consists in a peculiar construction of the machine, as hereinafter fully shown and described, whereby it may be readily converted from a riding or sulky-cultivator into a walking-cultivator, or one without a driver's seat, and a very simple and efficient cultivator obtained. In the accompanying sheet of drawings—

Figure 1:
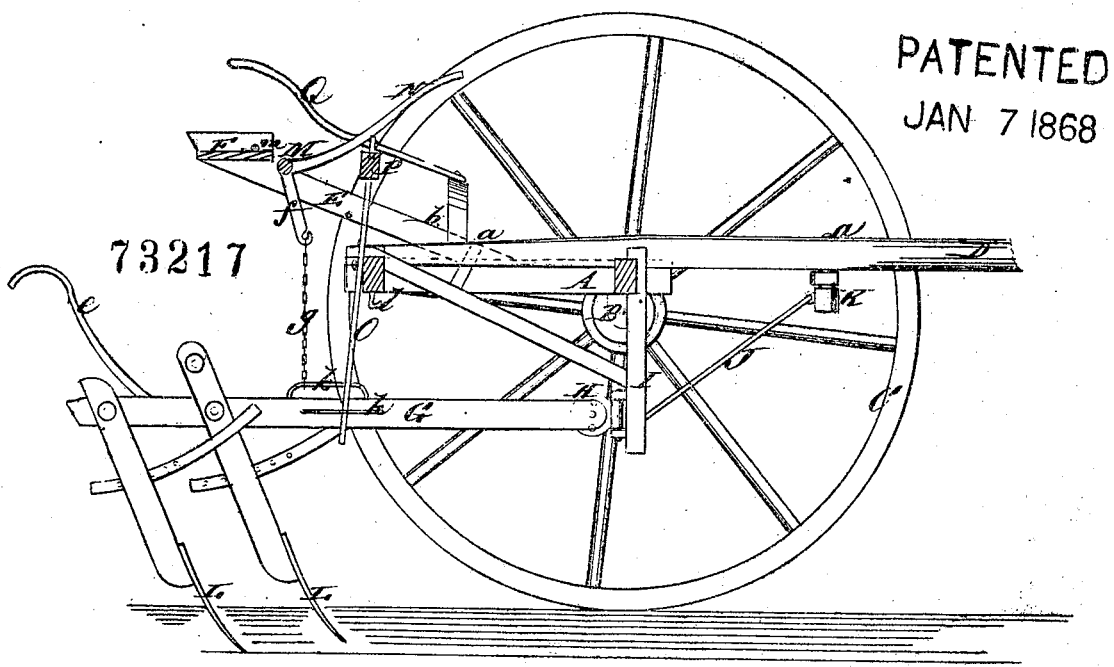
Figure 2:
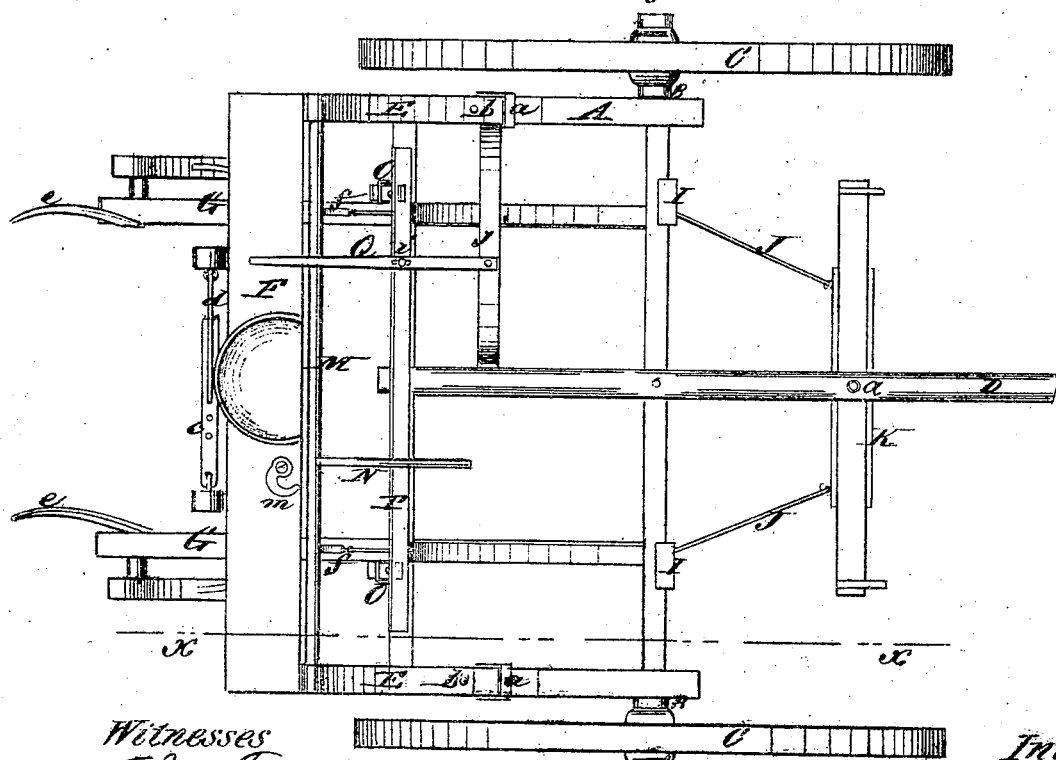

Figure 1 is a side sectional view of my invention, taken in the line $x\ x$, fig. 2.

Figure 2, a plan or top view of the same.

Similar letters of reference indicate like parts.

A represents the frame of the machine, which is of rectangular form, and has axles, B, attached, one to each side of it, at its front end, to receive the wheels C C. D is a draught-pole attached to the frame A, and E E are two inclined bars, which are secured to the side pieces of the frame A, and extend back beyond the rear of the same, the driver's seat, F, being secured on the rear of said bars. The bars E E, at their front ends, are fitted under clips $a$, which are attached to the side pieces of the frame A, and have pins, $b$, passing through them into the side pieces. By withdrawing these pins at any time, the bars E and driver's seat may be detached from the frame of the machine. G G represent two plough-beams, the front ends of which are attached by universal joints H to the lower ends of pendants I attached to the front cross-bar of the main frame A. These pendants I are braced by rods J J, the front ends of which are attached to a cross-bar, K, the latter being secured to the draught-pole D by the same bolt, $a$, which secures the double-tree to the draught-pole, the bar K being below the double-tree. The plough-beams have each two ploughs, L, attached, and they are connected by a bar, $c$, and hook, $d$, and each beam is provided with a handle, $e$. On the bars E E there is placed a shaft, M, which is allowed to turn freely in suitable bearings, and has a handle, N, attached to it. This shaft has two arms $ff$ projecting from it, and these arms are connected by chains $g$ with the plough-beams G G. To the rear bar of the main frame A there are pivoted two arms O, one near each end, and the upper ends of the arms O are connected by a bar, P, and the lower ends pass through staples $h$ in the sides of the plough-beams. To the bar P a lever, Q, is secured by a pin, $i$, the front end of said lever being pivoted to a transverse bar, $j$, secured at one end to the draught-pole, and at the opposite end to one side of the frame A. By actuating the lever Q, which is done by the driver on seat F, when the seat is attached to the machine, the ploughs L are moved laterally, so as to conform to the sinuosities of the rows of plants, and by actuating the handle N the ploughs may be raised out of the ground whenever required; and they may be held up when required, as in moving the machine from place to place, by having staples $k$, which are driven in the upper surfaces of the plough-beams, fitted on hooks $l$ in the under side of the rear bar of the frame A. For temporary suspension, a hook, $m$, on seat F, may be made to engage with handle N. This, however, can only be used when the device has the seat attached, the staples and hooks being employed for holding up the ploughs when the device is used as a walking-plough or cultivator. In case the driver prefers to walk at the rear of the machine, instead of riding, the bars E E are detached from the main frame A, and the plough-beams manipulated by moving the handles $e\ e$.

Having thus described my invention, I claim as new, and desire to secure by Letters Patent—

1. The detachable seat-bars E E, secured to the main frame A of the machine, substantially in the manner as and for the purpose set forth.

2. The attaching of the front ends of the plough-beams G G to the pendants I I by means of universal joints H, when this attachment is used in connection with the pivoted arms O O, connecting-bar P, and lever Q, for giving a lateral motion to the ploughs, substantially as described.

JOSEPH WIDMAN.

Witnesses:
HENRY SALTSMAN,
BERNARD DUEHR.